(12) United States Patent
Gladnick et al.

(10) Patent No.: US 9,930,243 B2
(45) Date of Patent: Mar. 27, 2018

(54) VARIABLE FOCAL LENGTH IMAGING SYSTEM

(71) Applicant: Mitutoyo Corporation, Kanagawa-ken (JP)

(72) Inventors: Paul Gerard Gladnick, Seattle, WA (US); Robert Kamil Bryll, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 165 days.

(21) Appl. No.: 15/144,291

(22) Filed: May 2, 2016

(65) Prior Publication Data

US 2017/0318216 A1 Nov. 2, 2017

(51) Int. Cl.
| | |
|---|---|
| *G02F 1/11* | (2006.01) |
| *H04N 5/232* | (2006.01) |
| *G02B 7/00* | (2006.01) |
| *G02B 21/02* | (2006.01) |
| *G02B 21/24* | (2006.01) |
| *G02B 21/36* | (2006.01) |
| *G02B 27/00* | (2006.01) |

(52) U.S. Cl.
CPC ......... *H04N 5/23212* (2013.01); *G02B 7/006* (2013.01); *G02B 21/025* (2013.01); *G02B 21/241* (2013.01); *G02B 21/361* (2013.01); *G02B 27/0068* (2013.01); *G02F 1/11* (2013.01)

(58) Field of Classification Search
CPC .... H04N 5/23212; G02F 1/11; G02B 27/0068
See application file for complete search history.

(56) References Cited

U.S. PATENT DOCUMENTS

| 6,542,180 B1 | 4/2003 | Wasserman et al. |
| 7,324,682 B2 | 1/2008 | Wasserman |
| (Continued) | | |

OTHER PUBLICATIONS

Mitutoyo Corporation & Micro Encoder Inc.,"QVPak 3D CNC Vision Measuring Machine User's Guide," Version 7, published Jan. 2003, 329 pages.

(Continued)

*Primary Examiner* — Nam Pham
(74) *Attorney, Agent, or Firm* — Seed Intellectual Property Law Group LLP

(57) ABSTRACT

A variable focal length (VFL) imaging system comprises a camera system, a first high speed variable focal length (VFL) lens, a second high speed variable focal length (VFL) lens, a first relay lens comprising a first relay focal length, a second relay lens comprising a second relay focal length, and a lens controller. The first relay lens and the second relay lens are spaced relative to one another along an optical axis of the VFL imaging system by a distance which is equal to a sum of the first relay focal length and the second relay focal length. The first high speed VFL lens and the second high speed VFL lens are spaced relative to one another along the optical axis on opposite sides of an intermediate plane which is located at a distance equal to the first relay focal length from the first relay lens. The lens controller is configured to provide synchronized periodic modulation of the optical power of the first high speed VFL lens and the optical power of the second high speed VFL lens.

16 Claims, 6 Drawing Sheets

(56) References Cited

U.S. PATENT DOCUMENTS

| | | | |
|---|---|---|---|
| 7,454,053 | B2 | 11/2008 | Bryll et al. |
| 8,111,905 | B2 | 2/2012 | Campbell |
| 8,111,938 | B2 | 2/2012 | Bryll et al. |
| 8,917,346 | B2 | 12/2014 | Geisler et al. |
| 9,060,117 | B2 | 6/2015 | Bryll et al. |
| 2006/0093205 | A1 | 5/2006 | Bryll et al. |
| 2010/0040355 | A1 | 2/2010 | Craen et al. |
| 2010/0177376 | A1 | 7/2010 | Arnold et al. |
| 2014/0368726 | A1 | 12/2014 | Gladnick |
| 2015/0092098 | A1 | 4/2015 | Konishi |
| 2015/0145980 | A1 | 5/2015 | Bryll |
| 2017/0013185 | A1* | 1/2017 | Gladnick ........... H04N 5/23212 |

OTHER PUBLICATIONS

Mitutoyo Corporation & Micro Encoder Inc., "QVPAK 3D CNC Vision Measuring Machine Operation Guide," Version 2.0, published Sep. 1996, 86 pages.

U.S. Appl. No. 14/795,409, entitled "Adaptable Operating Frequency of a Variable Focal Length Lens in an Adjustable Magnification Optical System", filed Jul. 9, 2015, 58 pages.

U.S. Appl. No. 14/841,051, entitled "Multi-Level Image Focus Using a Tunable Lens in a Machine Vision Inspection System", filed Aug. 31, 2015, 64 pages.

U.S. Appl. No. 14/854,624, entitled "Chromatic Aberration Correction in Imaging System Including Variable Focal Length Lens", filed Sep. 15, 2015, 55 pages.

"High-speed varifocal imaging with a tunable acoustic gradient index of refraction lens" (Optics Letters, vol. 33, No. 18, Sep. 15, 2008), 3 pages.

Cossairt, Oliver et al.. "Diffusion Coded Photography for Extended Depth of Field." *ACM Trans. On Graphics* (2010), 10 pages.

Duocastella, Marti et al. "Simultaneous Imaging of Multiple Focal Planes for Three-dimensional Microscopy Using Ultra-high-speed Adaptive Optics." *Journal of Biomedical Optics* vol. 17, No. 5 (2012): 050505-1-3, 4 pages.

Olivier, Nicolas et al. "Two-photon Microscopy with Simultaneous Standard and Extended Depth of Field Using a Tunable Acoustic Gradient-index Lens." *Optics Letters* vol. 34, No. 11 (2009): 1684-686, 3 pages.

Nagahara, Hajime et al. "Flexible Depth of Field Photography," published 2008, 14 pages.

* cited by examiner

VARIABLE FOCAL LENGTH IMAGING SYSTEM

BACKGROUND

Technical Field

This disclosure relates to imaging systems which may be incorporated in machine vision inspection systems and microscopes.

Description of the Related Art

Adjustable magnification optical systems may be utilized in precision non-contact metrology systems such as precision machine vision inspection systems (or "vision systems" for short). Such vision systems may be utilized to obtain precise dimensional measurements of objects and to inspect various other object characteristics, and may include a computer, a camera and optical system, and a precision stage that moves to allow workpiece traversal and inspection. One exemplary prior art system, characterized as a general-purpose "off-line" precision vision system, is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in its entirety. This type of system uses a microscope-type optical system and moves the stage so as to provide inspection images of either small or relatively large workpieces at various magnifications.

General-purpose precision machine vision inspection systems are generally programmable to provide automated video inspection. Such systems typically include GUI features and predefined image analysis "video tools" such that operation and programming can be performed by "non-expert" operators. For example, U.S. Pat. No. 6,542,180, which is incorporated herein by reference in its entirety, teaches a vision system that uses automated video inspection including the use of various video tools.

In various applications, it is desirable to perform high speed autofocus, extended depth of focus and/or other operations to facilitate high-speed measurements for high throughput in either stationary or non-stop moving inspection systems. The speed of autofocus and other operations requiring focusing in conventional machine vision inspection systems is limited by the motion of the camera through a range of Z-height positions. There is a need for improved autofocus and/or other operations utilizing alternative methods of collecting images of a range of focus distances (e.g., stacks of images for measuring Z-height positions) at a high speed and which particularly are operable at different levels of magnification without compromising the range of focus, image quality and/or dimensional accuracy in the images. Spherical aberrations in optical components may degrade the performance of such operations. There is therefore a need for an imaging system which provides reduced spherical aberrations in optical components of the imaging system.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A variable focal length (VFL) imaging system is provided. The VFL imaging system comprises a camera system, a first high speed variable focal length (VFL) lens, a second high speed variable focal length (VFL) lens, a first relay lens comprising a first relay focal length, a second relay lens comprising a second relay focal length, and a lens controller. The first relay lens and the second relay lens are spaced relative to one another along an optical axis of the VFL imaging system by a distance which is equal to a sum of the first relay focal length and the second relay focal length. The first high speed VFL lens and the second high speed VFL lens are spaced relative to one another along the optical axis on opposite sides of an intermediate plane which is located at a distance equal to the first relay focal length from the first relay lens. The lens controller is configured to provide synchronized periodic modulation of the optical power of the first high speed VFL lens and the optical power of the second high speed VFL lens.

DETAILED DESCRIPTION

Figure 1:
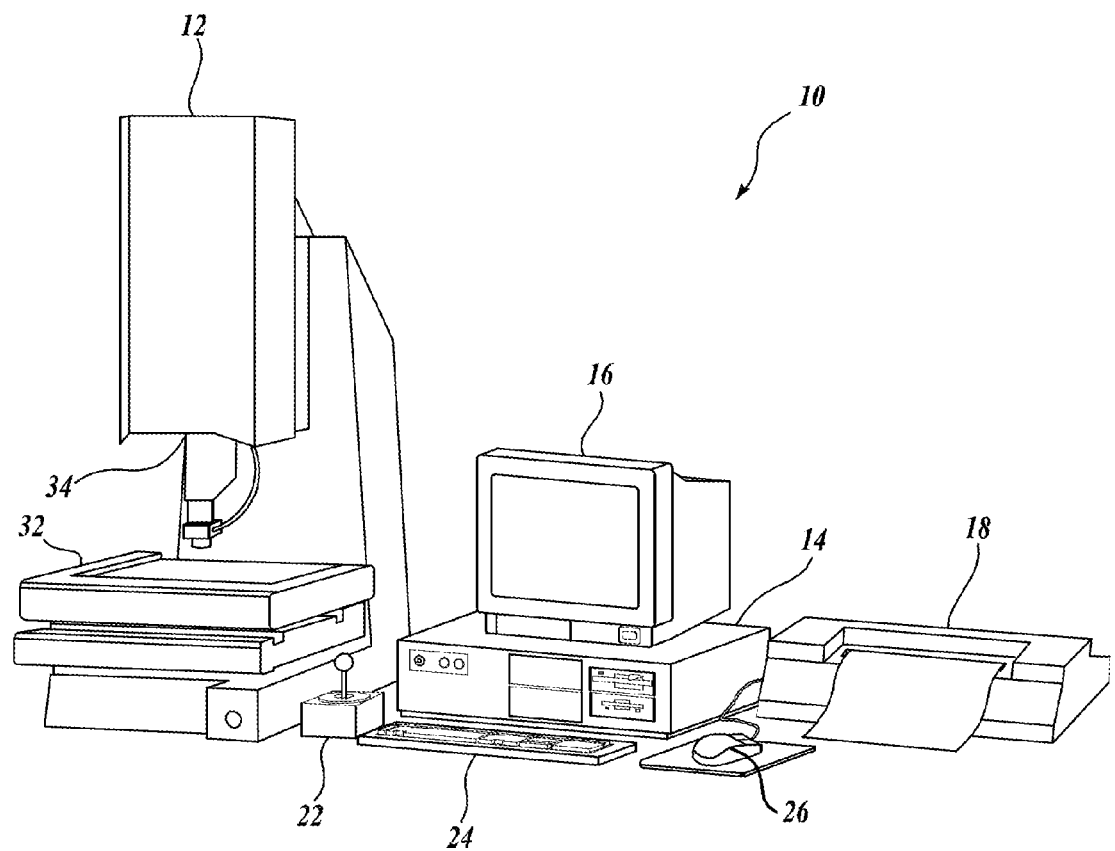
FIG. 1 is a diagram showing various typical components of a general-purpose precision machine vision inspection system.

FIG. 1 is a block diagram of one exemplary machine vision inspection system 10 usable in accordance with principles disclosed herein. The machine vision inspection system 10 includes a vision measuring machine 12 that is operably connected to exchange data and control signals with a controlling computer system 14, and with a monitor or display 16, a printer 18, a joystick 22, a keyboard 24, and a mouse 26. The monitor or display 16 may display a user interface suitable for controlling and/or programming the machine vision inspection system 10. In various implementations, a touchscreen tablet or the like may be substituted for and/or redundantly provide the functions of any or all of the computer system 14, display 16, joystick 22, keyboard 24, and mouse 26.

More generally, the controlling computer system 14 may comprise or consist of any computing system or device, and/or distributed computing environment, and the like, any of which may include one or more processors that execute software to perform the functions described herein. Processors include programmable general-purpose or special-purpose microprocessors, programmable controllers, application-specific integrated circuits (ASICs), programmable logic devices (PLDs), and the like, or a combination of such devices. Software may be stored in memory, such as random-access memory (RAM), read-only memory (ROM), flash memory, and the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on, that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable lenses. The zoom lens or interchangeable lenses generally provide various magnifications (e.g., 0.5× to 100×) for the images provided by the optical imaging system 34. Similar machine vision inspection systems are described in commonly assigned U.S. Pat. Nos. 7,324,682; 7,454,053; 8,111,905; and 8,111,938, each of which is hereby incorporated herein by reference in its entirety.

Figure 2:
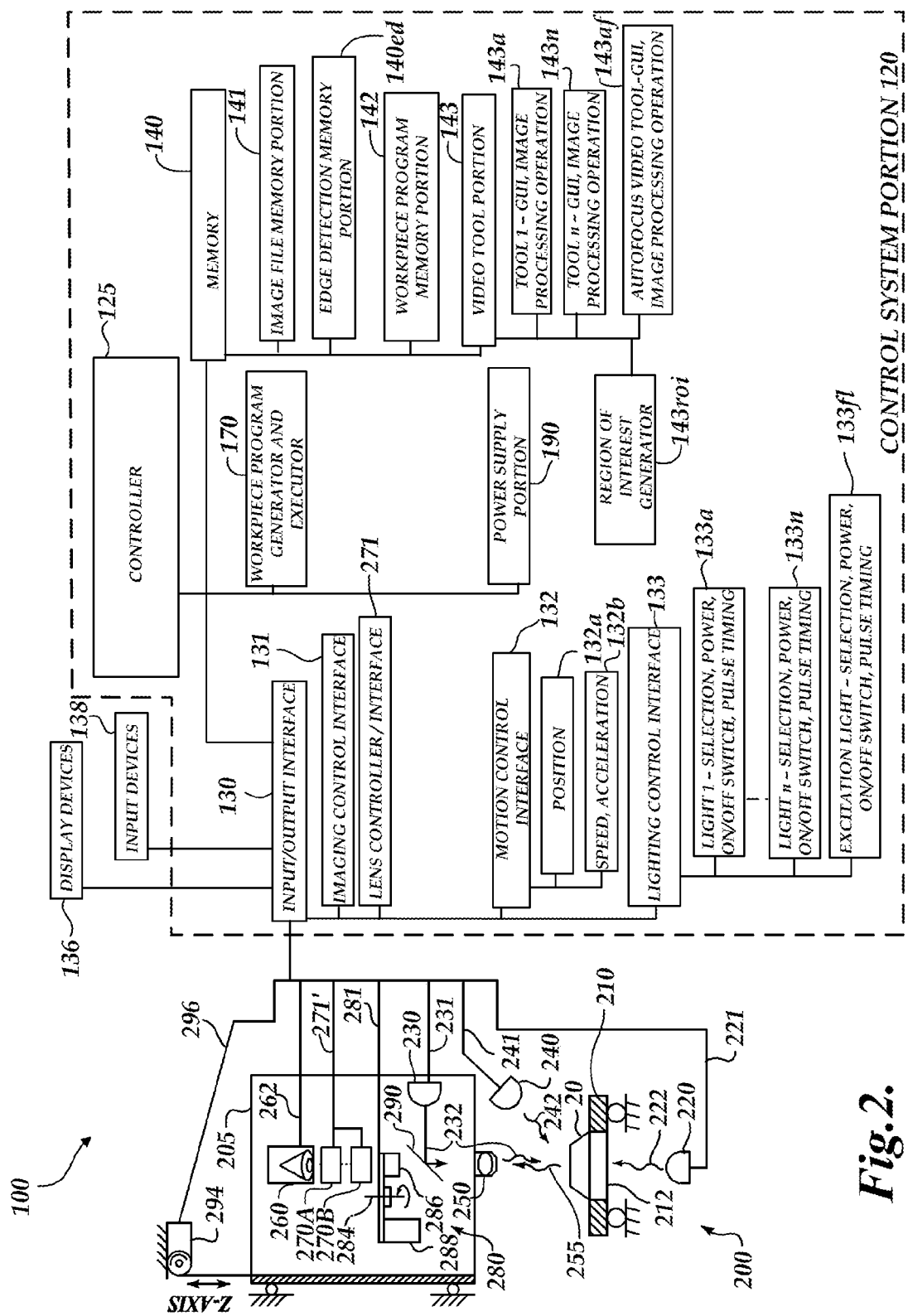
FIG. 2 is a block diagram of a control system portion and a vision components portion of a machine vision inspection system similar to that of FIG. 1 and including features disclosed herein.

FIG. 2 is a block diagram of a control system portion 120 and a vision components portion 200 of a machine vision inspection system 100 similar to the machine vision inspection system of FIG. 1, and including features as described herein. As will be described in more detail below, the control system portion 120 is utilized to control the vision components portion 200. The vision components portion 200 includes an optical assembly portion 205, light sources 220, 230, 240, and a workpiece stage 210 that may have a central transparent portion 212. The workpiece stage 210 is controllably movable along x- and y-axes that lie in a plane that is generally parallel to the surface of the stage where a workpiece 20 may be positioned.

The optical assembly portion 205 may include an optical detector 260 (e.g., a camera, a confocal optical detector, etc.), a first high speed variable focal length (VFL) lens 270A, a second high speed variable focal length (VFL) lens 270B, and may also include an interchangeable objective lens 250 and a turret lens assembly 280 having lenses 286, 288. Alternatively to the turret lens assembly, a fixed or manually interchangeable magnification-altering lens, or a zoom lens configuration, or the like, may be included. In various implementations, the various lenses may be included as part of a variable magnification lens portion of the optical assembly portion 205. In various implementations, the interchangeable objective lens 250 may be selected from a set of fixed magnification objective lenses (e.g., a set ranging from 0.5× to 100×, etc.)

In various implementations, the optical assembly portion 205 is controllably movable along a z-axis that is generally orthogonal to the x- and y-axes by using a controllable motor 294 that drives an actuator to move the optical assembly portion 205 along the z-axis to change the focus of the image of the workpiece 20. The controllable motor 294 is connected to an input/output interface 130 via a signal line 296. As will be described in more detail below, the first high speed VFL lens 270A and the second high speed VFL lens 270B may also be operated to periodically modulate a focus position. A workpiece 20, or a tray or fixture holding a plurality of workpieces 20, which is to be imaged using the machine vision inspection system 100 is placed on the workpiece stage 210. In various implementations, the workpiece stage 210 may be controllable to move (e.g., in the x- and y-axes directions) relative to the optical assembly portion 205, such that the imaged area (e.g., as imaged through the interchangeable objective lens 250, etc.) moves between locations on a workpiece 20, and/or among a plurality of workpieces 20.

One or more of a stage light 220, a coaxial light 230, and a surface light 240 (e.g., a ring light) may emit source light 222, 232, 242, respectively, to illuminate the workpiece or workpieces 20. The coaxial light 230 may emit light 232 along a path including a mirror 290. The source light is reflected or transmitted as workpiece light 255, and the workpiece light (e.g., as used for imaging) passes through the interchangeable objective lens 250, the turret lens assembly 280, the first high speed VFL lens 270A, and the second high speed VFL lens 270B, and is gathered by the optical detector 260 (e.g., a camera, etc.). In various implementations, the optical detector 260 inputs the workpiece light and outputs signal data (e.g., one or more images of the workpiece(s) 20, a confocal brightness signal, etc.) on a signal line 262 to the control system portion 120. The light sources 220, 230, 240 may be connected to the control system portion 120 through signal lines or busses 221, 231, 241, respectively. The control system portion 120 may rotate the turret lens assembly 280 along axis 284 to select a turret lens through a signal line or bus 281 to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, and a lighting control interface 133. The motion control interface 132 may include a position control element 132a, and a speed/acceleration control element 132b, although such elements may be merged and/or indistinguishable. The lighting control interface 133 may include lighting control elements 133a, 133n, 133fl that control, for example, the selection, power, on/off switch, and strobe pulse timing, if applicable, for the various corresponding light sources of the machine vision inspection system 100.

In accordance with the principles disclosed herein, the input/output interface 130 may further include a lens controller/interface 271. Briefly, in one implementation, the lens controller/interface 271 may include a lens controller including a lens focus operating circuit and/or routine, or the like. The lens controller/interface 271 may be configured or controlled by a user and/or an operating program, and may utilize a signal line 271' to control the first high speed VFL lens 270A and the second high speed VFL lens 270B to periodically modulate the optical power of each (e.g., sinusoidally) and thereby periodically modulate a focus position of the imaging system over a plurality of focus positions along a Z-height direction at a determined operating frequency.

In various implementations, the imaging control interface 131 and/or lens controller/interface 271 may further include an extended depth of field mode, as described in more detail in copending and commonly assigned U.S. Patent Publication No. 2015/0145980, which is hereby incorporated herein by reference in its entirety. An extended depth of field mode may be selected by a user to provide at least one image (e.g., a composite image) of a workpiece with a depth of field that is greater than what may be provided by the vision components portion 200 when focused at a single focus position. In various implementations, the imaging control interface 131 and/or lens controller/interface 271 may also further include a magnification change adjustment mode, which may be selected or automatically implemented when a magnification change is made or detected, as described in more detail in copending and commonly assigned U.S. patent application Ser. No. 14/795,409, entitled "Adaptable Operating Frequency of a Variable Focal Length Lens in an Adjustable Magnification Optical System", filed on Jul. 9, 2015, which is hereby incorporated herein by reference in its entirety. Other systems and methods including VFL lenses are described in copending and commonly assigned U.S. patent application Ser. No. 14/841,051, entitled "Multi-Level Image Focus Using a Tunable Lens in a Machine Vision Inspection System", filed on Aug. 31, 2015, and in copending and commonly assigned U.S. patent application Ser. No. 14/854,624, entitled "Chromatic Aberration Correction in Imaging System Including Variable Focal Length Lens", filed on Sep. 15, 2015, each of which is hereby incorporated herein by reference in its entirety.

The memory 140 may include an image file memory portion 141, an edge-detection memory portion 140ed, a workpiece program memory portion 142 that may include one or more part programs or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. The video tool portion also includes an autofocus video tool 143af that determines the GUI, image-processing operation, etc., for focus height measurement operations. The autofocus video tool 143af may additionally include a high-speed focus height tool that may be utilized to measure focus heights with high speed, as described in more detail in copending and commonly assigned U.S. Patent Publication No. 2014/0368726, which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool, resorting to a generalized text-based programming language, or the like. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image-processing operations of a particular instance of a video tool. It should be noted that the visible user interface features are sometimes referred to as the video tool with the underlying operations being included implicitly.

The signal lines or busses 221, 231, 241 of the stage light 220, the coaxial light 230, and the surface light 240, respectively, are all connected to the input/output interface 130. The signal line 262 from the optical detector 260, the signal line 271' from the first high speed VFL lens 270A and the second high speed VFL lens 270B, and the signal line 296 from the controllable motor 294 are connected to the input/output interface 130. In addition to carrying image data, the signal line 262 may carry a signal from the controller 125 that initiates certain processes (e.g., image acquisition, confocal brightness measurement, etc.).

One or more display devices 136 (e.g., the display 16 of FIG. 1) and one or more input devices 138 (e.g., the joystick 22, keyboard 24, and mouse 26 of FIG. 1) may also be connected to the input/output interface 130. The display devices 136 and input devices 138 may be used to display a user interface that may include various graphical user interface (GUI) features that are usable to perform inspection operations, and/or to create and/or modify part programs, to view the images captured by the optical detector 260, and/or to directly control the vision system components portion 200. The display devices 136 may display user interface features (e.g., as associated with the lens controller/interface 271, focus signal processing portion 277, etc.).

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one or more of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a current workpiece (e.g., a run mode workpiece) or workpieces, which is similar to the representative workpiece used when creating the part program.

Figure 3:
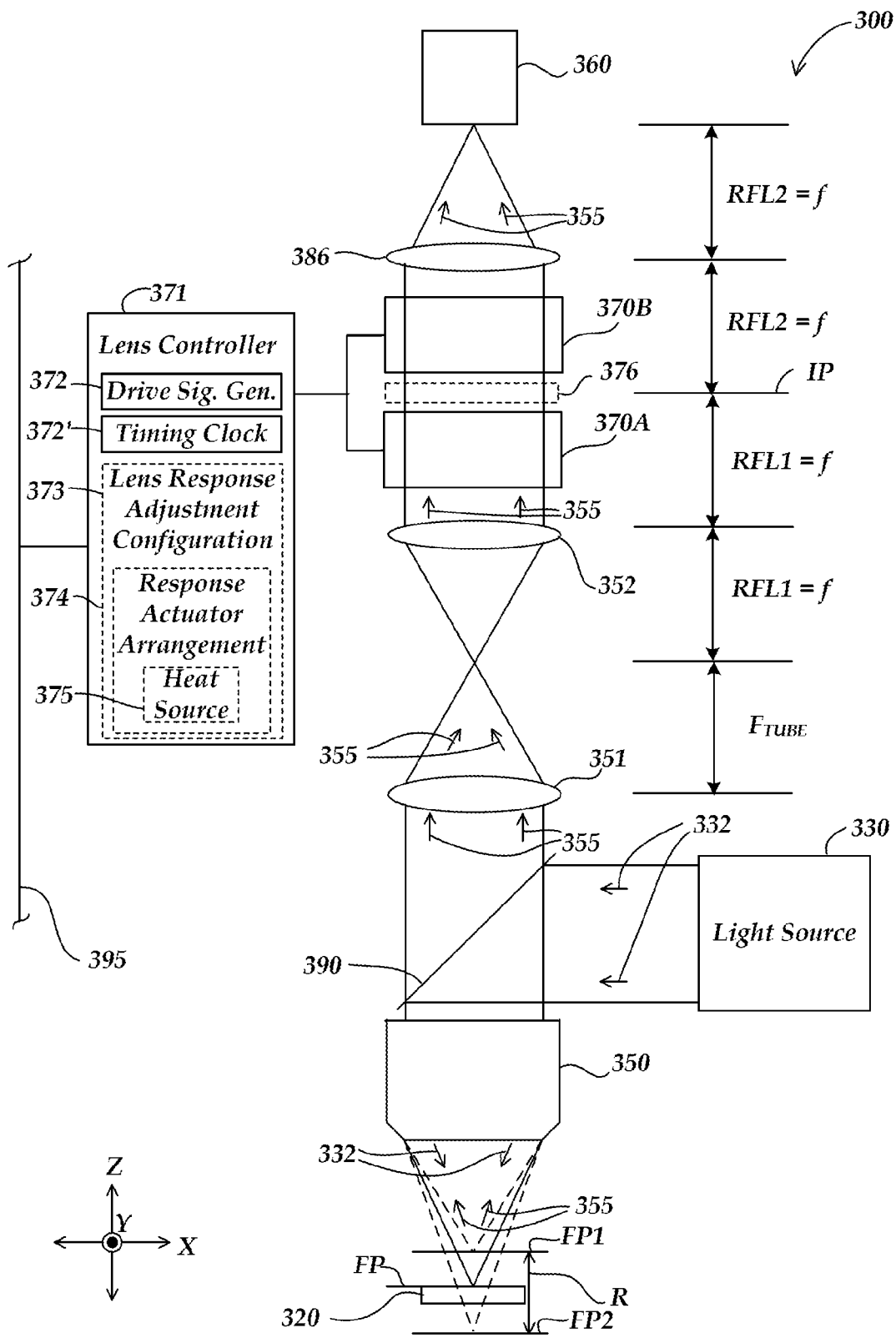
FIG. 3 is a schematic diagram of a variable focal length (VFL) imaging system that may be adapted to a precision non-contact metrology system, such as a machine vision inspection system, and operated according to the principles disclosed herein.

FIG. 3 is a schematic diagram of a variable focal length (VFL) imaging system 300 that may be adapted to a precision non-contact metrology system such as a machine vision inspection system and operated according to the principles disclosed herein. It will be appreciated that certain numbered components 3XX of FIG. 3 may correspond to and/or have similar operations as similarly numbered components 2XX of FIG. 2, except as otherwise described below. As shown in FIG. 3, the VFL imaging system 300 includes a light source 330, an objective lens 350, a tube lens 351, a first relay lens 352, a first high speed variable focal length (VFL) lens 370A, a second high speed variable focal length (VFL) lens 370B, a second relay lens 386, a lens controller 371, and an optional filter 376 (e.g. a spatial filter) located at an intermediate plane IP. In various implementations, each of the lens controllers 371, as well as additional components, may be interconnected by one or more data/control busses (e.g., a system signal and control bus 395) and/or application programming interfaces, or by direct connections between the various elements.

The first relay lens 352 comprises a first relay focal length RFL1 and the second relay lens 386 comprises a second relay focal length RFL2. The first relay lens 352 and the second relay lens 386 are spaced relative to one another along an optical axis OA of the VFL imaging system 300 by a distance which is equal to a sum of the first relay focal length RFL1 and the second relay focal length RFL2. The first high speed VFL lens 370A and the second high speed VFL lens 370B are spaced relative to one another along the optical axis on opposite sides of the intermediate plane IP which is located at a distance equal to the first relay focal length RFL1 from the first relay lens 352. In the implementation shown in FIG. 3, both RFL1 and RFL2 are equal to a focal length f. The lens controller 371 is configured to provide synchronized periodic modulation of the optical power of the first high speed VFL lens 370A and the optical power of the second high speed VFL lens 370B, as will be described in further detail below.

In some implementations, the first and second high speed VFL lenses 370A, 370B may be approximately identical.

In some implementations, the first high speed VFL lens 370A and the second high speed VFL lens 370B may be driven by a shared signal from the lens controller 371.

In various implementations, the light source 330 is configurable to illuminate a workpiece 320 (e.g., with strobed or continuous-wave illumination) in a field of view of the VFL imaging system 300. In various implementations, the light source 330 may include first, second, third, etc., sources of illumination as part of an illumination system. For example, the light source 330 may be operated to provide an instance of strobed illumination by operating a corresponding source of illumination (e.g., a source of illumination that is part of the light source 330). In various implementations, in order to achieve proper lighting balance, the light source 330 may be controllable so as to allow for independent adjustment of the intensity of all instances of strobed illumination (e.g., each corresponding to a different source of illumination within the light source 330) as well as simultaneous adjustment to control an overall brightness of an image.

In operation, in the implementation shown in FIG. 3, the light source 330 is a "coaxial" light source configured to emit source light 332 along a path including a partial mirror 390 and through the objective lens 350 to a surface of a workpiece 320, wherein the objective lens 350 receives workpiece light 355 that is focused at a focus position FP proximate to the workpiece 320, and outputs the workpiece light 355 to the tube lens 351. In other implementations, analogous light sources may illuminate the field of view in a non-coaxial manner, for example a ring light source may illuminate the field of view. In various implementations, the objective lens 350 may be an interchangeable objective lens and the tube lens 351 may be included as part of a turret lens assembly (e.g., similar to the interchangeable objective lens 250 and the turret lens assembly 280 of FIG. 2). In various implementations, the objective lens 350, tube lens 351, or any of the other lenses referenced herein may be formed from or operate in conjunction with individual lenses, compound lenses, etc. The tube lens 351 receives the workpiece light 355 and outputs it to the first relay lens 352.

The first relay lens 352 receives the workpiece light 355 and outputs it to the first high speed VFL lens 370A. The first high speed VFL lens 370A receives the workpiece light 355 and outputs it to the second high speed VFL lens 370B. If the imaging system 300 comprises the filter 376, the light output from the first high speed VFL lens 370A may be filtered (e.g. spatially filtered). The second high speed VFL lens 370B receives the workpiece light 355 and outputs it to the relay lens 386. The relay lens 386 receives the workpiece light 355 and outputs it to an optical detector (e.g., a camera system) 360. In various implementations, the optical detector 360 may capture an image of the workpiece 320 during an image exposure period, and may provide the image to a control system portion (e.g., similar to the operation of the optical detector 260 for providing an image to the control system portion 120 in FIG. 2).

The first high speed VFL lens 370A and the second high speed VFL lens 370B are electronically controllable to vary the focus position FP of the imaging system (e.g., during one or more image exposures, during a confocal brightness determination, etc.). The focus position FP may be moved within a range R bound by a focus position FP1 and a focus position FP2. It will be appreciated that in various implementations, the range R may be selected by a user or may result from design parameters or may otherwise be automatically determined. In general with respect to the example of FIG. 3, it will be appreciated that certain of the illustrated dimensions may not be to scale. For example, the first high speed VFL lens 370A and the second high speed VFL lens 370B may have different proportional dimensions than those illustrated (e.g., may be less wide and up to 50 mm long or longer for certain applications in order to provide a desired amount of lensing power, etc.).

In various implementations, a machine vision inspection system may comprise a control system (e.g., the control system 120 of FIG. 2) that is configurable to operate in conjunction with a lens controller 371 or to otherwise control the first high speed VFL lens 370A and the second high speed VFL lens 370B to periodically modulate a focus position of the VFL imaging system 300. In some implementations, the first high speed VFL lens 370A and the second high speed VFL lens 370B may very rapidly adjust or modulate the focus position (e.g., periodically, at a rate of at least 300 Hz, or 3 kHz, or 70 kHz, or much higher). In one example implementation, the range R may be approximately 10 mm (e.g., for a 1× objective lens 350). In various implementations, the first high speed VFL lens 370A and the second high speed VFL lens 370B are advantageously chosen such that they do not require any macroscopic mechanical adjustments in the imaging system and/or adjustment of the distance between the objective lens 350 and the workpiece 320 in order to change the focus position FP. In such a case, as described in the previously incorporated '980 publication, an extended depth of field image may be acquired. Furthermore there are no macroscopic adjustment elements or associated positioning non-repeatability to degrade accuracy when the same imaging system is used for acquiring fixed focus inspection images, which may be used for precision measurements (e.g., for accuracies on the order of a few micrometers, or tenths of micrometers, or less, and the like). As described in the previously incorporated '726 publication, the changes in the focus position FP may also be utilized to rapidly acquire an image stack including a plurality of images at a plurality of positions along a Z-height direction proximate to the workpiece 320.

In various implementations, the first high speed VFL lens 370A and the second high speed VFL lens 370B may be tunable acoustic gradient index of refraction ("TAG") lenses. A tunable acoustic gradient index of refraction lens is a high-speed VFL lens that uses sound waves in a fluid medium to modulate a focus position and may periodically sweep a range of focal lengths at a frequency of several hundred kHz. Such a lens may be understood by the teachings of the article, "High-speed varifocal imaging with a tunable acoustic gradient index of refraction lens" (Optics Letters, Vol. 33, No. 18, Sep. 15, 2008), which is hereby incorporated herein by reference in its entirety. Tunable acoustic gradient index lenses and related controllable signal generators are available, for example, from TAG Optics, Inc., of Princeton, N.J. The Model TL2.B.xxx series lenses, for example, are capable of modulation up to approximately 600 kHz.

In various implementations, as described in more detail in the previously incorporated '726 publication, the optical detector 360 may comprise a sensor with a global shutter, i.e., a sensor, that exposes each pixel simultaneously. Such an implementation is advantageous in that it provides the capability to measure image stacks without motion of a workpiece or any part of the VFL imaging system 300. In various alternative implementations, the optical detector 360 may comprise a sensor with an electronic rolling shutter (ERS) system. For example, a camera system may comprise a black and white CMOS sensor using SXGA resolution coupled with an electronic rolling shutter (ERS) system (e.g., model MT9M001 from Aptina Imaging of San Jose, Calif.).

The first high speed VFL lens 370A and the second high speed VFL lens 370B may be driven by the lens controller 371, which may generate a signal to operate them. In one implementation, the lens controller 371 may be a commercial controllable signal generator. In some implementations, the lens controller 371 may be configured or controlled by a user and/or an operating program (e.g., through the lens controller/interface 271, as outlined previously with respect to FIG. 2). In some implementations, the lens controller 371 may control the first high speed VFL lens 370A and the second high speed VFL lens 370B to periodically modulate their optical power (e.g., sinusoidally) and thereby periodically modulate a focus position of the imaging system over a plurality of focus positions along a Z-height direction at a high operating frequency. For example, in some exemplary implementations, a tunable acoustic gradient index of refraction lens may be configured for focal scanning rates as high as 400 kHz, although it should be appreciated that slower focus position adjustments and/or modulation frequencies may be desirable in various implementations and/or applications. For example, in various implementations a periodic modulation of 300 Hz, or 3 kHz, or 70 kHz, or 250 kHz, or the like may be used. In implementations where slower focus position adjustments are used, the first high speed VFL lens 370A and the second high speed VFL lens 370B may each comprise a controllable fluid lens, or the like. In various implementations, the periodically modulated VFL lens optical power may define a first periodic modulation phase.

In various implementations, the lens controller 371 may include a drive signal generator portion 372. The drive signal generator portion 372 may operate (e.g., in conjunction with a timing clock 372') to provide a periodic signal. In various implementations, a phase timing signal may be provided by the lens controller 371 that is synchronized with the periodical signal of the drive signal generator portion 372.

In the example of FIG. 3, the first and second relay lenses 352, 386 and the first and second high speed VFL lenses 370A, 370B are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. As part of the Keplerian telescope configuration, a focal length $F_{TUBE}$ of the tube lens 351 is illustrated as being approximately equidistant to a midpoint between the tube lens 351 and the first relay lens 352, as is the focal length f of the relay lens 352. In alternative implementations, the focal length $F_{TUBE}$ for the tube lens 351 may be made to be different than the focal length f of the first relay lens 352 (which corresponds to one of the 4 f's of the 4f optical configuration). In various implementations where the tube lens 351 may be included as part of a turret lens assembly, it may be desirable for other tube lenses of the turret lens assembly, when rotated into the operational position, to have a focal point at the same location (i.e., so as to meet the focal point of the first relay lens 352).

As described in more detail in the previously incorporated '409 application, the ratio of the focal length $F_{TUBE}$ to the focal length f can be utilized to alter the diameter of the collimated beam of workpiece light 355 out of the first relay lens 352 relative to the collimated beam of the workpiece light 355 that is input to the tube lens 351. It will be appreciated with respect to the collimated beams of workpiece light 355 that are respectively input to the tube lens 351 and output from the first relay lens 352, that in various implementations such collimated beams may be extended into longer path lengths and/or beam splitters may be utilized with respect to such collimated beams for providing additional optical paths (e.g., as directed to different camera systems, etc.).

In various implementations, the illustrated 4f optical configuration permits placing the first high speed VFL lens 370A and the second high speed VFL lens 370B (e.g., which may be a low numerical aperture (NA) device, such as a tunable acoustic gradient index of refraction lens), around the Fourier plane of the objective lens 350 (i.e. around the intermediate plane IP). This configuration may maintain the telecentricity at the workpiece 320 and may minimize scale change and image distortion (e.g., including providing constant magnification for each Z-height of the workpiece 320 and/or focus position FP). The Keplerian telescope configuration (e.g., including the tube lens 351 and the first relay lens 352) may be included between the microscope configuration and the 4f optical configuration, and may be configured to provide a desired size of the projection of the objective lens clear aperture between the first high speed VFL lens 370A and the second high speed VFL lens 370B at the intermediate plane IP. Alternatively, a Galilean telescope could be utilized instead of the Keplerian telescope to shorten the optical track length. Spherical aberrations in a high speed VFL lens may degrade the performance of a VFL imaging system. One way to reduce spherical aberrations is to use a smaller clear aperture in a high speed VFL lens. For example, a clear aperture may be restricted to be below 8.5 mm in diameter. However, a smaller clear aperture is the result of increased demagnification by the Keplerian telescope configuration and also reduces the range R at the workpiece 320. Splitting optical power between two high speed VFL lenses (e.g. the first high speed VFL lens 370A and the second high speed VFL lens 370B) reduces spherical aberrations without the need to reduce the clear aperture and thereby preserves or increases the range R at the workpiece 320. In some implementations, this may reduce spherical aberrations by a factor of five while providing the same optical power modulation (e.g. +/−0.625 diopter).

In some implementations, the lens controller 371 may comprise a lens response adjustment configuration 373 (shown as optional in dashed lines) operable to adjust a resonant frequency of at least one of the first and second high speed VFL lenses 370A, 370B, such that their resonant frequencies are approximately the same. High speed VFL lenses do not typically have identical resonant frequencies because of component variations such as cavity dimensions and piezo cylinder Q factors. The lens response adjustment configuration 373 provides a means to match the resonant frequencies of the first and second high speed VFL lenses 370A, 370B in order to synchronize their optical power modulation. In some implementations, the lens response adjustment configuration 373 may comprise a response actuator arrangement 374 configured to alter the resonant frequency of at least one of the first and second high speed VFL lenses 370A, 370B, and the lens response adjustment configuration 373 may control the response actuator arrangement 374 to adjust the resonant frequency of at least one of the first and second high speed VFL lenses 370A, 370B, such that their resonant frequencies are approximately the same. In some configurations, the response actuator arrangement 374 may comprise a heat source 375 operable to alter the temperature of at least one of the first and second high speed VFL lenses 370A, 370B, in order to alter its resonant frequency. Operations of a response actuator arrangement comprising a heat source are described in detail with respect to FIG. 6.

It should be appreciated that the VFL imaging system 300 may be a component of a machine vision inspection system. However, this is exemplary only and not limiting. In various implementations, the VFL imaging system 300 may be a component of a microscope or another imaging device.

Figure 4:
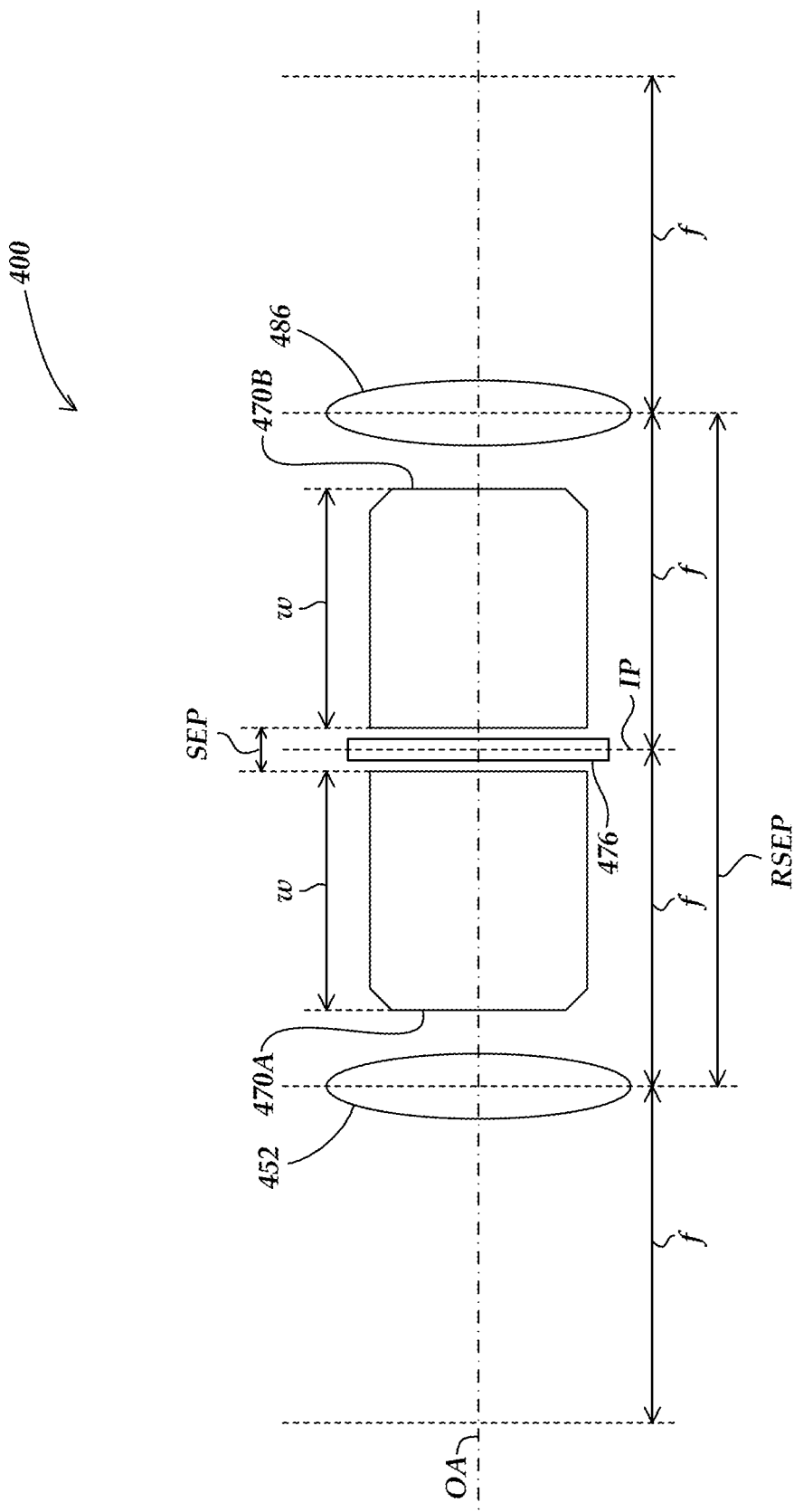
FIG. 4 is a schematic diagram of a portion of variable focal length (VFL) imaging system.

FIG. 4 is a schematic diagram of a portion of a variable focal length (VFL) imaging system 400. The variable focal length imaging system 400 is similar to the variable focal length (VFL) imaging system 300 of FIG. 3. Elements numbered 4XX are similar to elements numbered 3XX in FIG. 3 and may be understood by analogy.

The variable focal length imaging system 400 comprises a first relay lens 452 and a second relay lens 486, which are arranged as a 4f optical configuration, a first high speed variable focal length (VFL) lens 470A, a second high speed variable focal length (VFL) lens 470B, and a filter 476 (e.g. a spatial filter or a fixed or programmable amplitude and/or phase filter) placed at an intermediate plane IP. The intermediate plane IP is located at a distance equal to the first relay focal length f from the first relay lens 452 which serves as a Fourier conjugate plane to a microscope objective (e.g. the objective lens 350) in the 4f optical configuration.

In some implementations, the filter 476 may be a fixed pattern pupil filter. In other implementations, the filter 476 may be a programmable spatial light modulator. In some implementations, the filter 476 may comprise a deconvolution filter and the VFL imaging system 400 may be configured to provide an extended depth of focus image. In some implementations, the spatial filter 476 may alter amplitude and/or phase of the transmitted light. In some implementations, the filter 476 may be a polarization filter.

As shown in FIG. 4, the first relay lens 452 and the second relay lens 486 are separated by a distance RSEP which is equal to 2*f. In some implementations, RSEP may be at least 135 mm. A typical TAG lens may have a width w along an optical axis OA which is approximately 60 mm. When the first high speed VFL lens 470A and the second high speed VFL lens 470B are TAG lenses, a value of RSEP which is at least 135 mm allows the first high speed VFL lens 470A and the second high speed VFL lens 470B to fit between the first relay lens 452 and the second relay lens 486. The first high speed VFL lens 470A and the second high speed VFL lens 470B are separated by a distance SEP along the optical axis OA. In some implementations, SEP may be at least 5 mm in order to allow adequate spacing when the filter 476 is a chrome on glass fixed pattern pupil filter. However, in some implementations, SEP may be at least 15 mm in order to allow adequate spacing when the filter 476 is a programmable spatial light modulator. In some implementations, the filter 476 may be a switchable filter and the VFL imaging system 400 may comprise a filter wheel or another means of changing filters in order to match a specific objective lens and/or a desired function.

Figure 5:
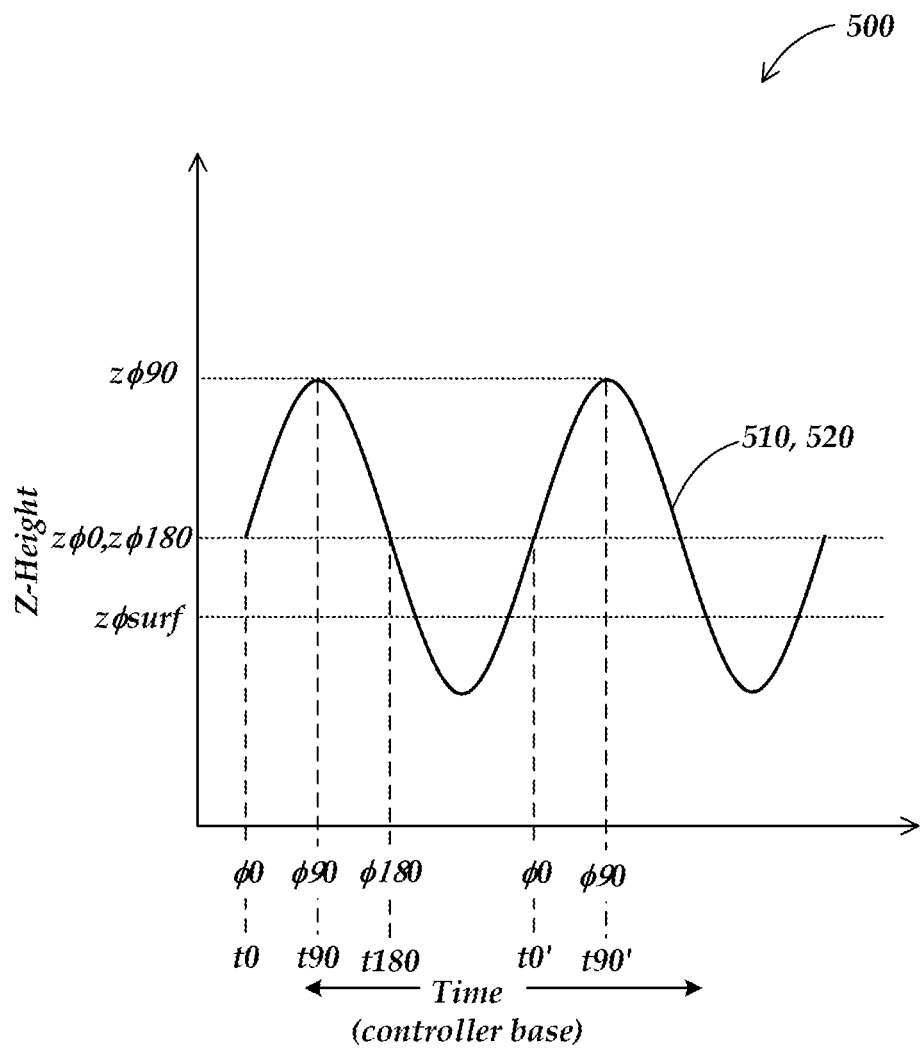
FIG. 5 is a timing diagram illustrating phase timings for a periodically modulated control signal and optical response of the VFL imaging system of FIG. 3.

FIG. 5 is a timing diagram 500 illustrating phase timings for a periodically modulated control signal 510 and optical response 520 of the VFL imaging system 300 of FIG. 3. In the example of FIG. 5, an ideal case is illustrated in which the control signal 510 and the optical response 520 have similar phase timings and are thus represented as identical signals. In various implementations, the control signal 510 may be related to the drive signal that is produced by the drive signal generator 372 of FIG. 3, and the optical response 520 may be representative of the periodically modulated focus position of the imaging system which is controlled by periodically modulating the optical power of the first high speed VFL lens 370A and the second high speed VFL lens 370B, as outlined above.

In various implementations, the sinusoidal shapes of the curves 510, 520 may depend on the lenses in series (e.g., the objective lens 350, the first high speed VFL lens 370A, the second high speed VFL lens 370B, etc. as illustrated in FIG. 3), for which the optical power of the combination of the first high speed VFL lens 370A and the second high speed VFL lens 370B goes through a cycle as indicated in FIG. 5 and is equal to 2*f (where f=focal length). As will be described in more detail below, a Z-height versus phase characterization that relates respective Z-heights to respective phase timing signal values may be established by calibration according to known principles (e.g., by repeatedly stepping a surface to a known Z-height, and then manually or computationally determining the phase timing that best focuses an image at the known Z-height, and storing that relationship in a lookup table or the like).

The timing diagram 500 illustrates phase timings (e.g., $\varphi 0$, $\varphi 90$, $\varphi 180$, $\varphi 270$, etc.) which are equal to respective phase timing signal values (e.g., t0, t90, t180, t270, etc.) of the control signal 510, which correspond to respective Z-heights (e.g., $z\varphi 0$, $z\varphi 90$, $z\varphi 180$, $z\varphi 270$, etc.). In various implementations, the phase timing signal values (e.g., t0, t90, t180, t270, etc.) may be determined according to a phase timing signal (e.g., as provided by a clock or other technique for establishing a timing relative to the periodic modulation, etc.). It will be understood that the phase timing signal values shown in the timing diagram 500 are intended to be exemplary only and not limiting. More generally, any phase timing signal value will have an associated focus position Z-height within the illustrated range of focus positions (e.g., the range in the illustrated example having a maximum Z-height 490 and a minimum Z-height 4270).

Figure 6:
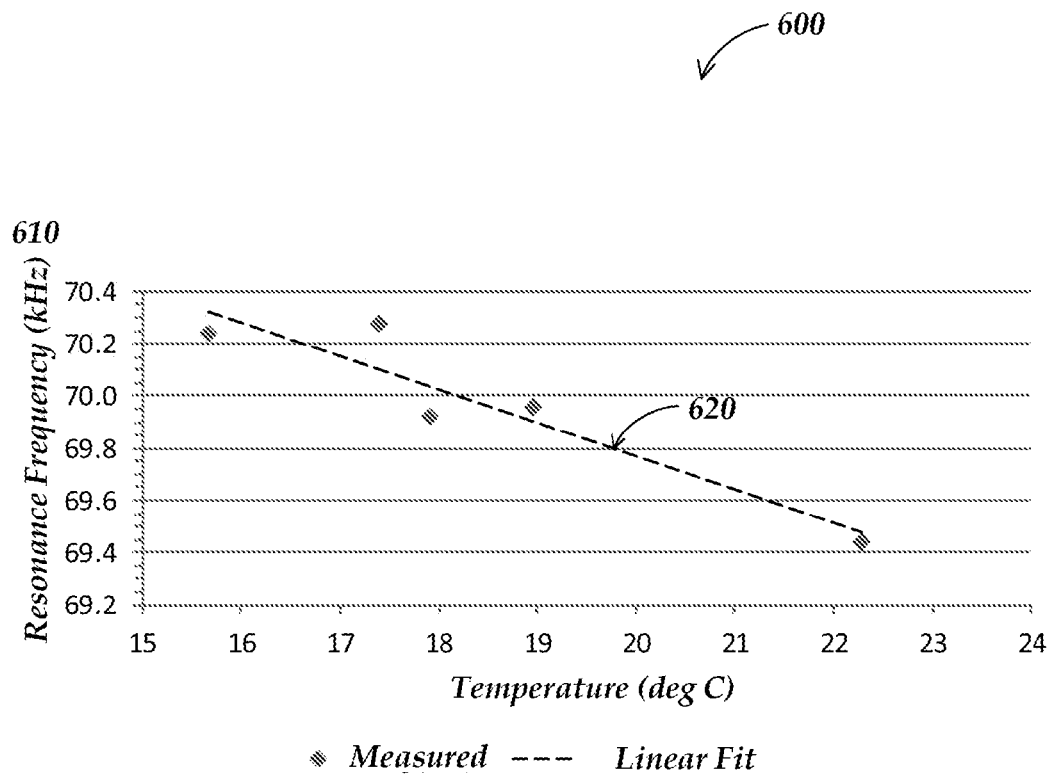
FIG. 6 is a diagram of a graph illustrating resonant frequencies of one type of variable focal length lens at various operating temperatures.

FIG. 6 is a diagram of a graph 600 illustrating resonant frequencies of one type of variable focal length lens at various operating temperatures. The graph 600 shows a set of measured resonant frequencies 610 of a TAG lens (in kHz) as a function of temperature (in degrees C.), and a linear fit 620. The linear fit 620 has a slope of approximately −130 Hz/deg C. In one implementation, the TAG lens characterized by the graph 600 may be used as the second high speed VFL lens 370B while coupled to the heat source 375 of the response actuator arrangement 374. The lens response adjustment configuration 373 may control the response actuator arrangement 374 to adjust the resonant frequency of the second high speed VFL lens 370B based on the linear fit 620. In some implementations, a feedback sensor such as a confocal optical sensor or an accelerometer may provide feedback for adjusting the temperature and, thus, the resonant frequency of the second high speed VFL lens 370B.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The embodiments of the invention in which an exclusive property or privilege is claimed are defined as follows:

1. A variable focal length (VFL) imaging system, comprising:
    a camera system;
    a first high speed variable focal length (VFL) lens;
    a second high speed variable focal length (VFL) lens;
    a first relay lens comprising a first relay focal length;
    a second relay lens comprising a second relay focal length; and
    a lens controller, wherein:
        the first relay lens and the second relay lens are spaced relative to one another along an optical axis of the VFL imaging system by a distance which is equal to a sum of the first relay focal length and the second relay focal length;
        the first high speed VFL lens and the second high speed VFL lens are spaced relative to one another along the optical axis on opposite sides of an intermediate plane which is located at a distance equal to the first relay focal length from the first relay lens; and
        the lens controller is configured to provide synchronized periodic modulation of an optical power of the first high speed VFL lens and an optical power of the second high speed VFL lens.

2. The VFL imaging system of claim 1 wherein the first and second high speed VFL lenses are approximately identical.

3. The VFL imaging system of claim 1, further comprising a filter located at the intermediate plane.

4. The VFL imaging system of claim 3 wherein the filter is a fixed pattern pupil filter.

5. The VFL imaging system of claim 3 wherein the filter is a programmable spatial light modulator.

6. The VFL imaging system of claim 3 wherein:
    the filter comprises a deconvolution filter; and
    the imaging system is configured to provide an extended depth of focus image.

7. The imaging system of claim 3 wherein the filter is at least one of an amplitude or a phase modifying filter.

8. The imaging system of claim 3 wherein the filter is a polarization filter.

9. The VFL imaging system of claim 3, further comprising a filter wheel configured to provide selectable filters.

10. The VFL imaging system of claim 1 wherein the first high speed VFL lens and the second high speed VFL lens are tunable acoustic gradient index of refraction (TAG) lenses.

11. The VFL imaging system of claim 10 wherein the first high speed VFL lens and the second high speed VFL lens are driven by a shared signal from the lens controller.

12. The VFL imaging system of claim 1 wherein the lens controller comprises a lens response adjustment configuration operable to adjust a resonant frequency of at least one of the first and second high speed VFL lenses such that their resonant frequencies are approximately the same.

13. The VFL imaging system of claim 12 wherein the lens response adjustment configuration comprises a response actuator arrangement configured to alter the resonant frequency of at least one of the first and second high speed VFL lenses, and the lens response adjustment configuration controls the response actuator arrangement to adjust the resonant frequency of at least one of the first and second high speed VFL lenses, such that their resonant frequencies are approximately the same.

14. The VFL imaging system of claim 13 wherein the response actuator arrangement comprises a heat source operable to alter a temperature of at least one of the first and second high speed VFL lenses in order to alter its resonant frequency.

15. The VFL imaging system of claim 1 wherein the first high speed VFL lens and the second high speed VFL lens are separated by a distance SEP along the optical axis which is at least 5 mm.

16. The VFL imaging system of claim 1 wherein the first relay lens and the second relay lens are separated by a distance RSEP along the optical axis which is at least 135 mm.

* * * * *